United States Patent [19]

Nakano et al.

[11] Patent Number: 5,409,785

[45] Date of Patent: Apr. 25, 1995

[54] FUEL CELL AND ELECTROLYTE MEMBRANE THEREFOR

[75] Inventors: Noboru Nakano, Tokyo; Ryuji Azuma, Anjo; Motohiro Nakashima, Nishio; Munehisa Horiguchi, Chiryu, all of Japan

[73] Assignee: Kabushikikaisha Equos Research, Tokyo, Japan

[21] Appl. No.: 994,343

[22] Filed: Dec. 21, 1992

[30] Foreign Application Priority Data

Dec. 25, 1991 [JP] Japan .................. 3-342554
Jun. 25, 1992 [JP] Japan .................. 4-167124

[51] Int. Cl.$^6$ ............................ H01M 8/10
[52] U.S. Cl. .................... 429/33; 429/249
[58] Field of Search ........... 429/33, 41, 42, 249, 429/254

[56] References Cited

U.S. PATENT DOCUMENTS

| | | | |
|---|---|---|---|
| 3,275,575 | 8/1966 | Fogle | 260/2.2 |
| 3,341,366 | 8/1967 | Hodgdon et al. | 136/86 |
| 3,392,096 | 7/1968 | Lawton et al. | 204/159.15 |
| 4,537,840 | 8/1985 | Tsukui et al. | 429/33 |
| 4,710,278 | 12/1987 | Polak | 204/129 |
| 5,211,984 | 5/1993 | Wilson | 429/42 |

OTHER PUBLICATIONS

Takeo Ozawa et al., "Fuel Cell and Application Thereof", published by Ohm sha Led., pp. 66–67 (1981).
Kiyoshi Koyama et al., "An Interpolymer Anionic Composite Reverse Osmosis Membrane Derived from Poly(vinyl Alcohol) and Poly(styrene . . . " J. App. Polymer Science, vol. 27, pp. 2783–2789, (1982).

*Primary Examiner*—José G. Dees
*Assistant Examiner*—Samuel Barts
*Attorney, Agent, or Firm*—Foley & Lardner

[57] ABSTRACT

The fuel cell disclosed in the present specification is provided with an electrolyte membrane comprising a three-dimensional structure composed of bridged chains of a first polymer stable to water, and a second polymer having a function as an electrolyte. In such an electrolyte membrane, the bridged chains of the first polymer hold the second polymer, and hence the membrane does not swell with water. Furthermore, the electrolyte membrane can be properly designed depending on conditions required of the fuel cell, by choosing the first and second polymers.

16 Claims, 7 Drawing Sheets

DETAIL VIEW OF
A MEASURING CELL

FUEL CELL AND ELECTROLYTE MEMBRANE THEREFOR

BACKGROUND OF THE INVENTION

The present invention relates to a fuel cell and an electrolyte membrane therefor. The fuel cell of the present invention is of a polyelectrolyte-membrane-provided type, and it is suitable, for example, as an electric source for automobile. The electrolyte membrane is an ion-exchange membrane which exchanges hydrated protons ($H^+ \cdot xH_2O$). Hydrated protons generated at the cathode (the fuel electrode) of the fuel cell are exchanged by said membrane and reach the anode (the oxidation agent electrode). Thus, an electric current flows through an external circuit connected to the both electrodes.

As such an electrolyte membrane, a perfluorosulfonic acid polymer is known by the name of Nafion 117 (a trade name, E.I. du Pont de Nemours & Co.). It is known that a poly(styrenesulfonic acid) is also usable as an electrolyte membrane. As to the above, please refer to Takeo Ozawa et al. "Fuel Cell and Applications Thereof", published by Ohm sha Ltd , p 66, 1981.

U.S. Pat. No. 4,537,840 discloses a fuel cell using a gel of a poly(styrenesulfonic acid) as an electrolyte. This literature is incorporated herein by reference.

Such an organic polyelectrolyte absorbs water to swell with ease. Therefore, when used in a fuel cell, the polyelectrolyte tends to be affected by water generated by a reaction which takes place at the fuel electrode and water broken into the cell from outer circumstance. In detail, the swelling causes a lowering of the mechanical strength, a deterioration of the durability, and an increase of the internal resistance. Furthermore, the polyelectrolyte is liable to be dissolved. In a fuel cell, a membrane of said electrolyte is held by a frame but in some cases, it brims over the frame to permeate into the electrode side owing to the swelling. In some other cases, the membrane peels from the electrode on account of the swelling.

Moreover, said electrolyte involves the following problem. When water evaporates owing to heat or the like during use of the electrolyte in a fuel cell, bubbles are formed inside the electrolyte and the electrolyte loses its ionic conductivity, so that the fuel cell ceases to work. That is, the electrolyte is poor in resistance to high temperatures.

The above problems are very disadvantageous for mounting the fuel cell on an automobile.

When a perfluorosulfonic acid polymer called Nafion 117 (a trade name, E.I. du Pont de Nemours & Co.) is used, it secures the heat resistance.

This polymer, however, is disadvantageous in that it is expensive, and that when methanol is used as fuel in a cell, the polymer is permeable to methanol.

There is known a polymer composite having a structure in which a three-dimensional structure is composed of the bridged chains of a first polymer, and a second polymer, a partially-crosslinked polymer, is held by the three-dimensional structure. Please refer to Kiyoshi Koyama et al. "An Interpolymer Anionic Composite Reverse Osmosis Membrane Derived from Poly(vinyl Alcohol) and Poly(styrene Sulfonic Acid)" Journal of Applied Polymer Science, Vol. 27 2783-2789 (1982).

SUMMARY OF THE INVENTION

An object of the present invention is to solve at least one of the above problems.

Another object of the present invention is to provide an inexpensive electrolyte membrane.

In the present invention, for achieving these objects, a membrane is formed using an organic polymer whose skeleton is composed of carbon, hydrogen and oxygen. In other words, fluorine was removed as much as possible from a polymer constituting a membrane. That is, an electrolyte membrane was formed out of a polymer containing no fluorine.

A further another object of the present invention is to prevent the electrolyte membrane from dissolving and swelling with water.

For this object, there is employed in this invention a structure in which a three-dimensional structure is formed by cross-linking a first polymer stable to water, and a second polymer having ion-exchange ability for hydrogenated proton, namely, having a function as an electrolyte for a fuel cell, is held by the three-dimensional structure. Even when the second polymer has a property of dissolving and swelling with water, the three-dimensional structure formed by the first polymer is not deformed, so that the electrolyte membrane itself, as a whole., does not dissolve nor swell with water.

The electrolyte membrane of the present invention may have a porous supporting member as its substrate. Said supporting member is impregnated, dipped or cast with a composition (a liquid) prepared by mixing the first polymer and the second polymer uniformly, after which said composition is cured. Then, the first polymer is crosslinked (by heating) to form the composition into a membrane. In this case, each of the first and second polymers is uniformly distributed in the membrane. In other words, the first polymer is uniformly penetrated into the second polymer. Because of the uniform penetration, the second polymer is limited in its movement by the three-dimensional structure formed by the first polymer and hence does not dissolve nor swell with water. Therefore, the electrolyte membrane is improved in mechanical strength and durability.

A still another object of the present invention is to provide a polyelectrolyte having a high methanol-shielding ability.

In the present invention, for achieving this object, there is employed a structure in which a three-dimensional structure is formed by crosslinking a poly(vinyl alcohol), and a poly(styrenesulfonic acid) is held by the three-dimensional structure. The three dimensional structure has a metanol-shielding ability owing to size in mesh thereof.

Still another object of the present invention is to improve the adhesion between the polyelectrolyte and electrodes.

DESCRIPTION OF THE PREFERRED EMBODIMENTS

In the present invention, for achieving this object, a fluorine-containing ion-exchange resin is placed between the polyelectrolyte and each of the electrodes, and the resulting assembly is hot-pressed at 100°-150° C. As the fluorine-containing ion-exchange resin, Nafion Solution 27, 470-4 (a trade name, mfd. by Aldrich Chemical Co.) is employed in the example. That such a resin becomes an excellent bonding layer between a polyelectrolyte and electrodes for a fuel cell is a novel information obtained from investigation by the present inventors.

As an organic polyelectrolyte usable in the present invention, poly(styrenesulfonic acid)s can be suitably used. There can also be exemplified products obtained by sulfonation with sulfuric acid of polymers such as polyethylenes, acrylic resins, methacrylic resins, styrene-butadiene copolymers, styrene divinylbenzene copolymers, ethylene-vinylalcohol copolymers etc. In addition, perfluorosulfonic acid polymers (Nafion) can also be used. These polyelectrolytes may be used singly or in combination of two or more thereof.

When a poly(styrenesulfonic acid) is used as the organic polyelectrolyte, the electrolyte membrane is produced in the following manner. A poly(vinyl alcohol) and the poly(styrenesulfonic acid) which have been purified are dissolved in an aqueous ethanol solution. In this case, the purpose of the dissolution in the aqueous ethanol solution is to extend the polymer chain by adjustment of the surface tension of the solution to be obtained. The weight ratio of the poly(styrenesulfonic acid) to the poly(vinyl alcohol) is preferably 1/1 to $\frac{1}{5}$, more preferably $\frac{2}{3}$. Then, the aqueous solution of the poly(vinyl alcohol), the poly(styrenesulfonic acid) and ethanol was sufficiently infiltrated into the inside of a porous supporting member membrane by dipping this membrane in the aqueous solution, or casting the aqueous solution on this membrane.

The aqueous solution is sufficiently infiltrated into the interiors of pores of the porous supporting member membrane by adjusting the surface tension of the aqueous solution by varying the mixing proportion of ethanol. The purpose of the infiltration into the interiors is to fit the porous supporting member membrane to water because in general, a membrane used as porous supporting member membrane is water-repellent. Resins such as polypropylenes, polyethylenes, poly(ethylene fluoride)s, etc. can be used in the porous supporting member membrane. There can be used porous supporting member membranes widely ranging in pore diameter from micron order to millimeter order.

The porous supporting member membrane thus impregnated with the aqueous solution is dried for 24 hours to remove water and ethanol in the membrane. By such mild drying, formation of air bubbles in the porous supporting member membrane can be prevented. Then, the porous supporting member membrane is heat-treated at 110°–150° C. for 1 to 48 hours, preferably at 110°–140° C. for 1 to 24 hours. The heat treatment causes crosslinking reaction of the poly(vinyl alcohol) component. Owing to the crosslinking reaction, the poly(styrenesulfonic acid), i.e., the organic polyelectrolyte, is held by the bridged chains of the polymeric alcohol. That is, a membrane in which the organic polyelectrolyte is held in the bridged chains of the polymeric alcohol constituting a three-dimensional network structure in formed. The higher the reaction temperature and the longer the reaction time, the more the progress of the crosslinking reaction. The membrane completed by much progress of the crosslinking reaction is hard and dense. The electrolyte membrane of the present invention thus obtained is highly insoluble, namely, it has a property different from the property of conventional organic polyelectrolytes, i.e., the property of dissolving in water or swelling with water.

The unreacted poly(vinyl alcohol) and poly(styrenesulfonic acid) are removed by alkali-treating the crosslinked electrolyte membrane by dipping in a sodium hydroxide solution. Owing to the alkali treatment, the ion-exchange group in said electrolyte membrane becomes $-SO_3-Na^+$. Therefore, the alkali-treated electrolyte membrane is dipped in a 1N-aqueous hydrochloric acid solution in order to change the ion-exchange group from $Na^+$ type to $H^+$ type. Thus, a poly(styrenesulfonic acid)-poly(vinyl alcohol) membrane (hereinafter referred to as PSSA-PVA membrane) having ion-exchange ability is obtained. This PSSA-PVA membrane is stored in pure water.

Next, electrodes used in the present invention are explained below.

A fuel electrode is composed of a water-repellent layer and a catalyst layer. The water-repellent layer is composed mainly of carbon particles bound together by a polytetrafluorocarbon. A reticulate current-collecting material is embedded in or pressure-bonded to the inside of the water-repellent layer. The water-repellent layer is made of an electrically conductive porous material with a high water repellency obtained by infiltrating or dispersing a water-repellent resin into electrically conductive porous material or fine particles which support no catalyst, and carrying out heat treatment. The high water repellency can be attained by adding a water repellency improver such as a water-repellent resin, wax, graphite fluoride powder or the like.

In the catalyst layer of the fuel electrode, a platinum-ruthenium alloy catalyst supported on carbon particles is dispersed. A process for producing the catalyst layer comprises infiltrating or dispersing a water-repellent resin into an electrically conductive porous material or fine powder which supports the catalyst, and carrying out heat treatment to form the catalyst layer which is a semi-water-repellent porous material.

Another process for producing the catalyst layer comprises mixing fine particles supporting the catalyst with fine particles supporting no catalyst which have been made highly water-repellent by addition of a water-repellent resin, and thereby forming a semi-water-repellent layer.

The above-mentioned catalyst layer and water-repellent layer are joined by press molding or hot press molding to form the fuel electrode. As the aforesaid water-repellent resin, polytetrafluoroethylenes (hereinafter referred to as PTFE), etc. can be used. As the aforesaid electrically conductive porous material, there can be used sintered metal plates, and products obtained by binding carbon black, titanium carbide, etc. with a binder. As to the amount of the water-repellent resin in the catalyst layer, when the electrically conductive porous material is composed of PTFE and carbon, the weight ratio of the PTFE to carbon is preferably 8:2 to 2:8, more preferably 3:7. It is ideal that the water-repellent layer has a complete water repellency and a high gas permeability. In the case of a combination of PTFE and carbon black, the weight ratio of PTFE to carbon black is suitably 6:4.

On the other hand, an oxidation agent electrode is obtained by agglomerating carbon particles supporting a platinum catalyst, with PTFE to form a porous material.

When there is employed an electrode structure using such a fuel electrode composed of the above-mentioned catalyst layer and water-repellent layer, the following take place. For example, in a fuel electrode in which methanol is used as fuel, methanol passes through the water-repellent layer in the form of vapor and then through the water-repellent portion of the catalyst layer, and dissolves in an electrolysis solution in which the catalysts are present. The methanol is oxidized on the catalyst near the methanol, and the carbon dioxide gas thus generated dissolves in the electrolysis solution. The water-repellent pores and hydrophilic pores in the catalyst layer are very fine and tangled with one another. Therefore, the carbon dioxide gas dissolved evaporates into the water-repellent pores before air bubbles are formed by supersaturation of the electrolyte solution with the dissolved gas. Then, the carbon dioxide gas reaches the rear of the electrode through a course opposite to that of methanol. In the rear, the carbon dioxide gas is released as bubbles into water.

When the above-mentioned electrolyte membrane (in which the organic polyelectrolyte is held in the bridged chains of the polymeric alcohol constituting a three-dimensional network structure) is held between the above-mentioned fuel electrode and oxidation agent electrode and the membrane and the electrodes are joined, a solution of a fluorine-containing ion-exchange resin, such as Nafion Solution (a trade name, mfd. by Aldrich Chemical Co.) is previously applied on the electrolyte membrane side of each of the fuel electrode and the oxidation agent electrode to form a coating film.

On the other hand, the above-mentioned PSSA-PVA membrane stored in pure water is held between the fuel electrode and the oxidation agent electrode, and the resulting assembly is set in a hot-pressing machine and pressed at 60°-100° C. and 0 kg/cm$^2$ to remove water present in the PSSA-PVA membrane. Then, the assembly of the sufficiently dried PSSA-PVA membrane and the electrodes was hot-pressed at 100°-150° C. and 216-250 kg/cm$^2$ for about 30 minutes to join the membrane to the electrodes. The assembly thus treated is sufficiently cooled to obtain a fuel cell.

Thus, the fuel electrode used in the present invention is placed together with the fluorine-containing ion-exchange resin with a high methanol-solubility applied near the catalyst layer of the fuel electrode. Therefore, on the ion-exchange resin side, the reactivity in the fuel electrode is not deteriorated.

In the fuel cell of the present invention, there can be used, for example, methanol and hydrogen gas as fuel. When methanol is used as fuel, an aqueous methanol solution is supplied to the fuel electrode. When hydrogen gas is used as fuel, it is preferable to maintain the water content of the electrolyte membrane at a suitable content by incorporating water vapor into, at least, a gas supplied to one of the electrodes, because the electrolyte membrane is dry at the beginning of supply of hydrogen gas.

BRIEF DESCRIPTION OF THE DRAWINGS

These and other objects and technical advantages of the present invention will be readily apparent from the following description of the preferred exemplary embodiment(s) of the invention in conjunction with the accompanying drawings, in which.

EXAMPLES

Production of an electrolyte membrane

Figure 1:
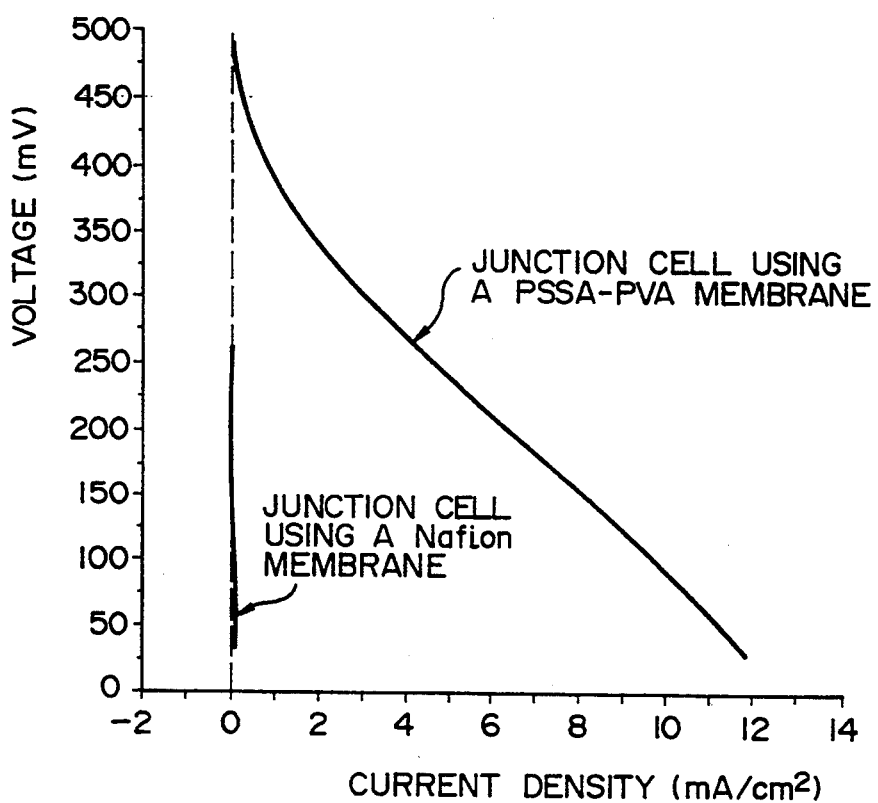
FIG. 1 is a graph showing output voltage-current density characteristics of an electrolyte membrane-electrodes joined product of an example and that of comparative example which were attained when methanol was used as fuel.

Preparation of a poly(styrenesulfonic acid):

Sodium bromide contained as impurity in a sodium poly(styrenesulfonate) (POLY NaSS 50, a trade name, mfd. by Tosoh Ltd.) was removed in the following manner. The sodium poly(styrenesulfonate) was precipitated by addition of acetone (a guaranteed reagent, mfd. by Wako Pure Chemical Industries Ltd.), and the precipitate was collected by filtration, whereby sodium bromide contained in the filtrate was removed. The reason for the removal of the sodium bromide is that $Br^-$ ions have an undesirable influence on crosslinking carried out later by heat treatment. The sodium poly(styrenesulfonate) obtained as the precipitate was washed several times with acetone. Then, the sodium poly(styrenesulfonate) thus washed was dissolved in pure water, and its sodium ions were exchanged for hydrogen ions by the use of an ion-exchange resin. The aqueous solution of poly(strenesulfonic acid) formed by the ion exchange was dried to precipitate this polymer as a solid. Thus, the poly(styrenesulfonic acid) having a mean molecular weight of 100,000 or more was obtained.

Preparation of a poly(vinyl alcohol):

A poly(vinyl alcohol) (Kuraray poval PVA-120, a trade name, mfd. by Kuraray Co., Ltd.; saponification degree 98 to 99 mol %) was dissolved in pure water and precipitated by addition of methanol (a guaranteed reagent, mfd. by Wako Pure Chemical Industries Ltd.). The poly(vinyl alcohol) precipitated was washed several times with methanol. Then, the poly(vinyl alcohol) was dried to be freed from methanol. Thus, the poly(vinyl alcohol) having a mean molecular weight of 1,700 or more was obtained.

Production of a PSSA-PVA membrane:

The purred poly(vinyl alcohol) and poly(styrenesulfonic acid) obtained in the manner described above were dissolved in an aqueous ethanol solution. A nylon net having a thickness of 160 $\mu$m, a rate of openings of 50% and a mesh opening of 160 $\mu$m×160 $\mu$m (No. NY160HC, mfd. by ZBF Co.) was sufficiently dipped in the aqueous solution of the poly(vinyl alcohol), the poly(styrenesulfonic acid) and ethanol, and passed between a pair of rollers placed at a predetermined distance from each other to adjust the thickness of the dipped membrane to 190 $\mu$m. The dipped membrane was then dried for 24 hours to be freed from ethanol and water contained therein. The dipped membrane thus dried was heat-treated at 120° C. for 24 hours to be subjected to crosslinking.

The dipped membrane subjected to crosslinking was immersed in a 1N-sodium hydroxide solution for 24 hours, whereby the unreacted poly(vinyl alcohol) and poly(styrenesulfonic acid) were removed. Then, the dipped membrane was immersed in a 1N-aqueous hydrochloric acid solution for 24 hours to change the ion-exchange group from $Na^+$ type into $H^+$ type. Thus, a PSSA-PVA membrane having an ion-exchange ability was obtained. The PSSA-PVA membrane was stored in pure water.

Production of electrodes

A copper net was pressure-bonded as a highly electrically conductive material for current collection to a plate made of PTFE and carbon black in the ratio of 6:4 to form a water-repellent layer. On the other hand, there was formed a catalyst layer of a semi-water-repellent porous material produced by binding, with a water-repellent binder, an electrically conductive powder supporting a binary catalyst consisting of platinum and ruthenium in amounts of 2 mg and 1 mg, respectively, per unit area ($cm^2$). The catalyst layer was press-molded together with the aforesaid water-repellent layer to produce a fuel electrode.

On the other hand, an oxidation agent electrode was produced in a porous state by agglomerating carbon particles supporting a platinum catalyst, with PTFE.

Method for joining the electrolyte membrane and the electrodes

The aforesaid PSSA-PVA membrane, i.e., the electrolyte membrane according to the present invention, was joined to the above electrodes in the following manner.

Nafion solution 27, 470-4 (a trade name, mfd. by Aldrich Chemical Co.), a solution of a fluorine-containing ion-exchange resin, was applied on each electrode in an amount of 1 to 5 cc/36 $cm^2$ (the area of the electrode) and dried at room temperature. The coating film thus formed was heat-treated at 130° C.

The PSSA-PVA membrane obtained by the above-mentioned treatments and the electrodes having the Nafion film formed thereon were set in a hot-pressing machine, and water contained in the PSSA-PVA membrane was removed at a pressing pressure of 0 kg/$cm^2$ while heating a press die at 60° C. Then, the assembly of the sufficiently dried PSSA-PVA membrane and the electrodes was hot-pressed at 130° C. and 230 kg/$cm^2$ for 30 minutes. Subsequently, the assembly thus treated was cooled for a sufficient time, i.e., about 12 hours to obtain a fuel cell of the present invention.

Table 1 shows a comparison between the joined state attained for the thus obtained fuel cells of the present example and that attained for fuel cells of a comparative example which were obtained without applying Nafion Solution on the electrodes.

TABLE 1

| | Electrode | Pressure (kg/$cm^2$) | Temperature (°C.) | Pressing time | After pressing | After 1 day | After 2 days | After 3 days | After 4 days |
|---|---|---|---|---|---|---|---|---|---|
| Example | | | | | | | | | |
| Lot 1 | Coated with Nafion | 210–216 | 125–130 | 600 sec × 3 times (30 min) | Wrinkled at the end | | | | Unchanged |
| Lot 2 | Coated with Nafion | 216–228 | 125–130 | 600 sec × 3 times (30 min) | Wrinkled at the end (a little) | Unchanged | | | |
| Lot 3 | Coated with Nafion | 216–228 | 125–130 | 600 sec × 3 times (30 min) | Good | Good | | | |
| Comparative Example | | | | | | | | | |
| Lot 1 | No coating | 216–228 | 125–130 | 600 sec × 3 times (30 min) | Turned up a little at the end | Peeled on the whole surface except a part of the surface | | | Unchanged |
| Lot 2 | No coating | 216–239 | 130–136 | 600 sec × 3 times (30 min) | Half peeled | Completely peeled | | | |
| Lot 3 | No coating | 216–239 | 130–136 | 600 sec × 3 times (30 min) | Peeled at both ends (a little) | Peeling became serious | Completely peeled | | |
| Lot 4 | No coating | 216–239 | 130–136 | 600 sec × 3 times (30 min) | Peeled a little at the upper part | Unchanged | Peeling became serious | | |

From Table 1, it can be seen that the electrode-electrolyte membrane-electrode joined products of the present example are superior in adhesion to those of the comparative example.

Figure 2:
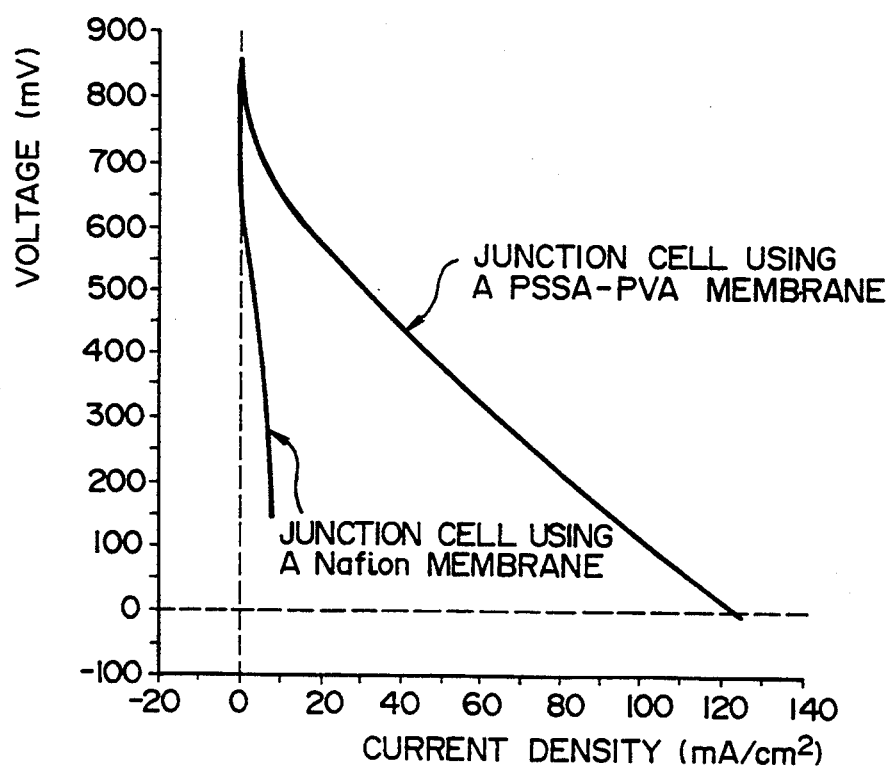
FIG. 2 is a graph showing output voltage-current density characteristics of an electrolyte membrane-electrodes joined product of the example and that of the comparative example which were attained when hydrogen was used as fuel.

Each of FIG. 1 and FIG. 2 shows an output voltage-current density curve of the joined product of the example (lot No. 3) and that of a joined product of a comparative example which was obtained using a membrane of Nafion alone as an electrolyte membrane. Methanol was used as fuel for the fuel cells shown in FIG. 1, and hydrogen was used as fuel for the fuel cells shown in FIG. 2. From the output voltage-current density curves shown in FIG. 1 and FIG. 2, it can be seen that at the same voltage, the joined product of the example gives a much higher current density than does the joined product of the comparative example.

In the electrolyte membrane of the example, the organic polyelectrolyte is held in the network of three-dimensional structure composed of bridged chains of the polymeric alcohol. Therefore, said electrolyte membrane is solid and has a high mechanical strength and good self-holding properties. Since said electrolyte membrane is not diluted with water, the fuel cell of the example using said electrolyte membrane is excellent in durability.

Furthermore in the fuel cell of the example, the electrolyte membrane and the electrodes do not easily peel from each other.

The fuel cell of the example can be used at a high temperature of up to about 150° C.

The specific resistance of the organic polyelectrolyte used in the fuel cell of the example can be adjusted to 1 to 2 $\Omega \cdot cm$ which is much lower than the specific resistance (7 $\Omega \cdot cm$) of a conventional material Nafion 117 (a trade name, mfd. by E.I. du Pont de Nemours & Co.). The current density in said organic polyelectrolyte is higher than that in the conventional material Nafion 117 (a trade name, mfd. by E.I. du Pont de Nemours & Co.).

Figure 3:
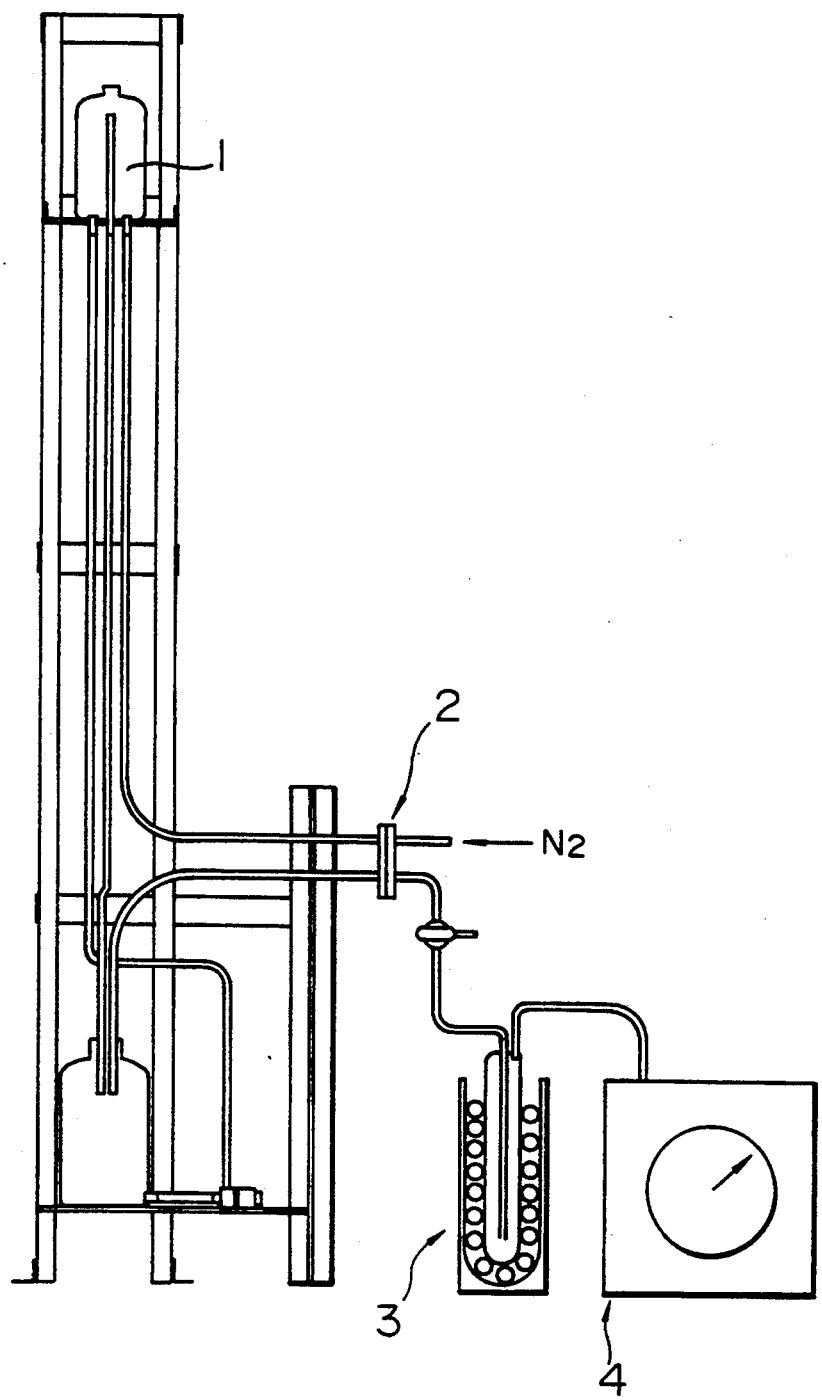
FIG. 3 is a schematic diagram showing an outline of the structure of an apparatus for measuring the degree of methanol permeation.

Next, a methanol permeation test on the electrolyte membrane of the example was carried out in the following manner. FIG. 3 is a schematic diagram showing an outline of the structure of an apparatus for measuring the degree of methanol permeation. The symbol 1 shows a container containing an aqueous methanol solution, which is placed at a high position in order to keep the level of the solution constant. The symbol 2 shows a measuring cell 2 in which the methanol permeability is measured, and which is placed at a position lower than that of the container 1 containing the aqueous methanol solution. The symbol 3 shows a trap for cooling and condensing nitrogen gas, methanol and water which are discharged from the measuring cell 2. The symbol 4 shows an integrating flow meter for measuring the integrated amount of the discharged nitrogen gas.

Figure 4:
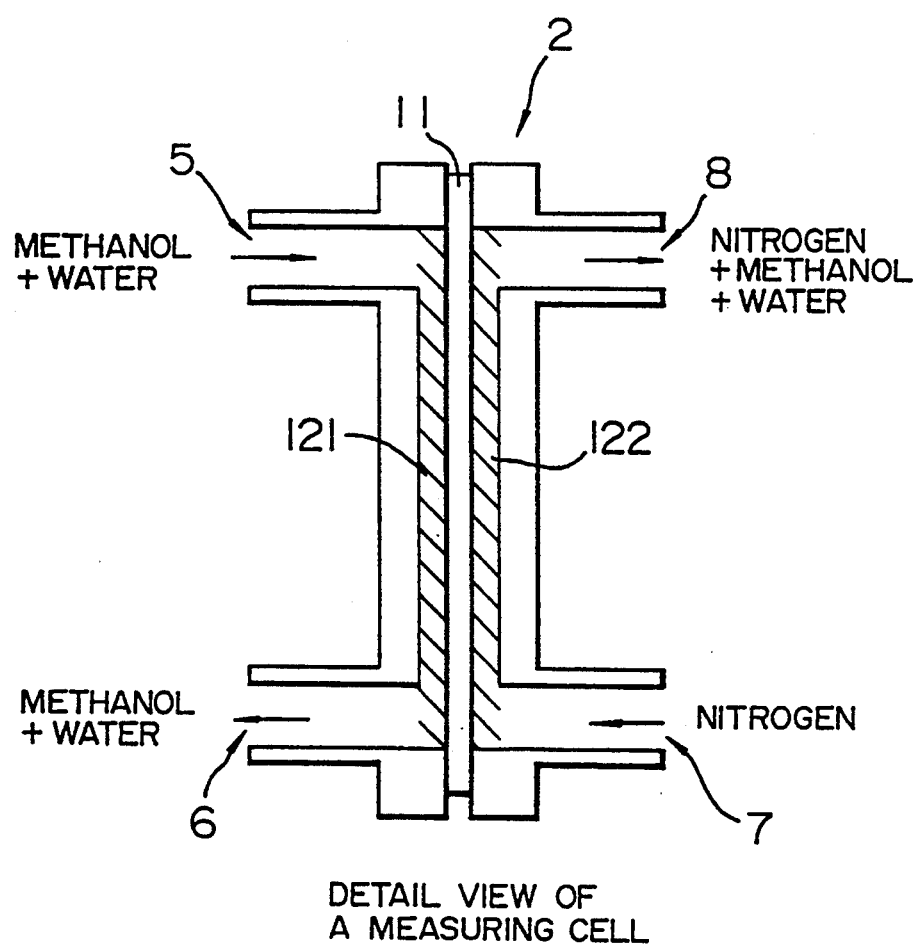
FIG. 4 is an enlarged view of the measuring cell 2 shown in FIG. 3.

FIG. 4 is an enlarged view of the measuring cell shown in FIG. 3. The symbol 11 shows the electrolyte membrane of the example. The membrane 11 is incorporated into the measuring cell 2 so as to be sandwiched between 1-mm mesh FEP nets 121 and 122 made of an ethylene fluoride-propylene copolymer, on both sides of the membrane 11, respectively. The measuring cell 2 has, on one side thereof, an inlet 5 for receiving methanol and water and an outlet 6 for discharging the received methanol and water. Methanol and water introduced into the measuring cell 2 through the inlet 5 pass through the FEP membrane 121 placed in contact with one side of the membrane 11, and then they are discharged through the outlet 6.

On the other hand, the measuring cell 2 has, on the other side thereof, an inlet for receiving nitrogen gas and an outlet 8 for discharging nitrogen gas, methanol and water. Nitrogen gas introduced through the inlet 7 passes through the FEP net 122 and is discharged through the outlet 8. In the FEP net 122, the nitrogen gas joins with methanol and water which have penetrated through the membrane 11, and they are discharged through the outlet 8.

Figure 5:
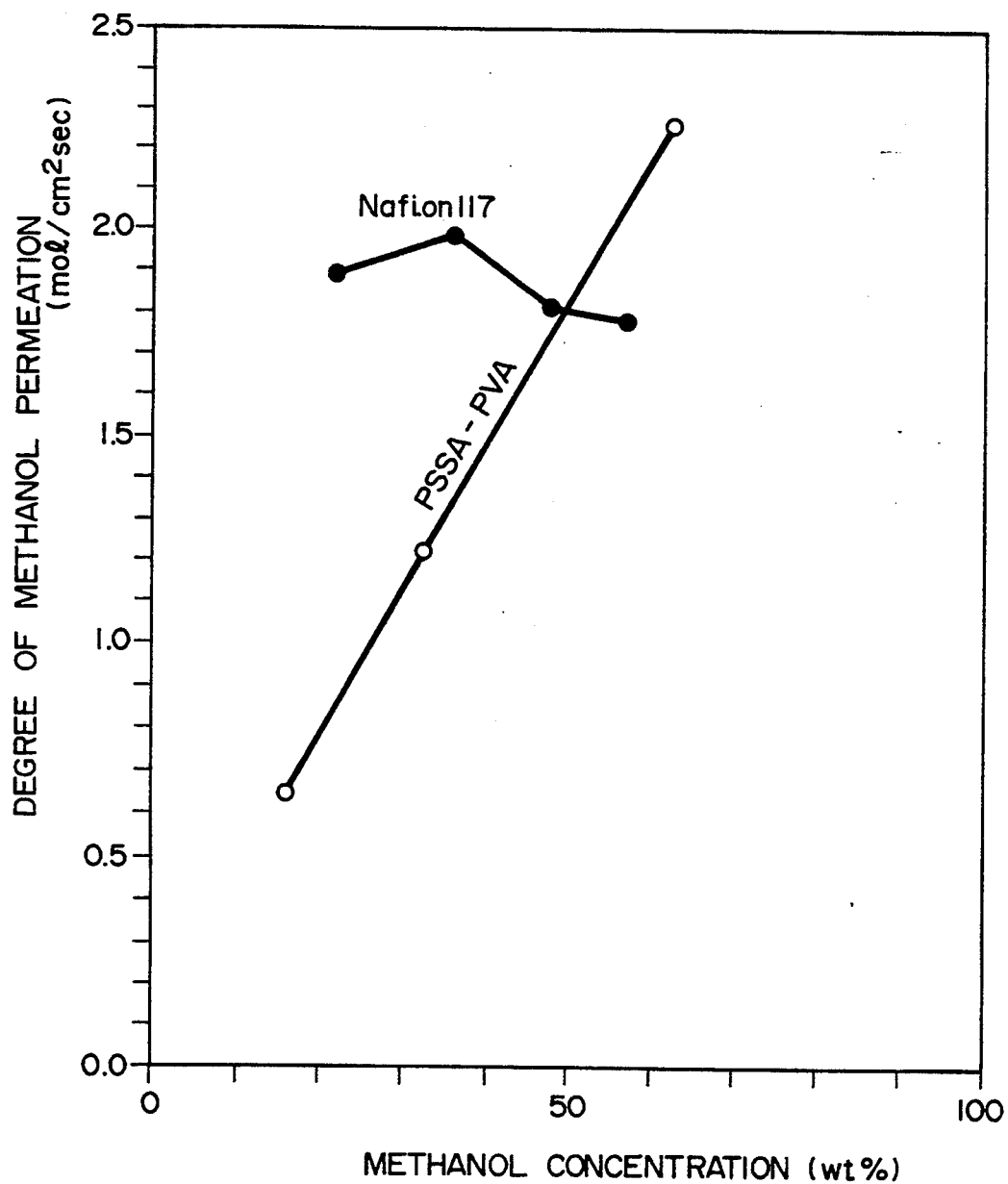
FIG. 5 is a graph showing relationships between the degree of methanol permeation and the concentration of an aqueous methanol solution which were determined for an electrolyte membrane of an example and that of a comparative example.

Using the apparatus shown in FIG. 3 and FIG. 4, the degree of methanol permeation was measured for the electrolyte membrane 11 of the example and a conventional Nafion 117 (a trade name, E.I. du Pont de Nemours & Co.) membrane. FIG. 5 is a graph showing relationships between the degree of methanol permeation and the concentration of the aqueous methanol solution. In FIG. 5, PSSA-PVA denotes the membrane 11 of the example.

From this graph, it can be seen that when an aqueous methanol solution having a concentration of less than 50% by weight is used, the membrane 11 of the example is excellent in methanol-excluding capability.

Next, the ion-exchange ability of the membrane 11 of the example was examined. Since the ion-exchange ability of the membrane 11 can be evaluated by measuring the electric resistance of the membrane 11, the electric resistance of the membrane 11 obtained by the above-mentioned method was measured by a four-probe technique. Consequently, the electric resistance was 0.68 $\Omega \cdot cm^2$. For comparison, the electric resistance of a Nafion 117 (a trade name, E.I. du Pont de Nemours & Co.) membrane was measured under the same conditions to be 1.52 $\Omega \cdot cm^2$. Therefore, it can be seen that the electrolyte membrane 11 of the example has an excellent ion-exchange ability.

Since the electrolyte membrane of the example has an excellent methanol-excluding capability and moreover has an excellent ion-exchange properties as an ion-exchange membrane, it can be used as an electrolyte membrane for preventing the permeation of methanol in a methanol fuel cell.

Furthermore, using said membrane, there can be provided a methanol fuel cell which, as a whole, is of a small size.

Figure 6:
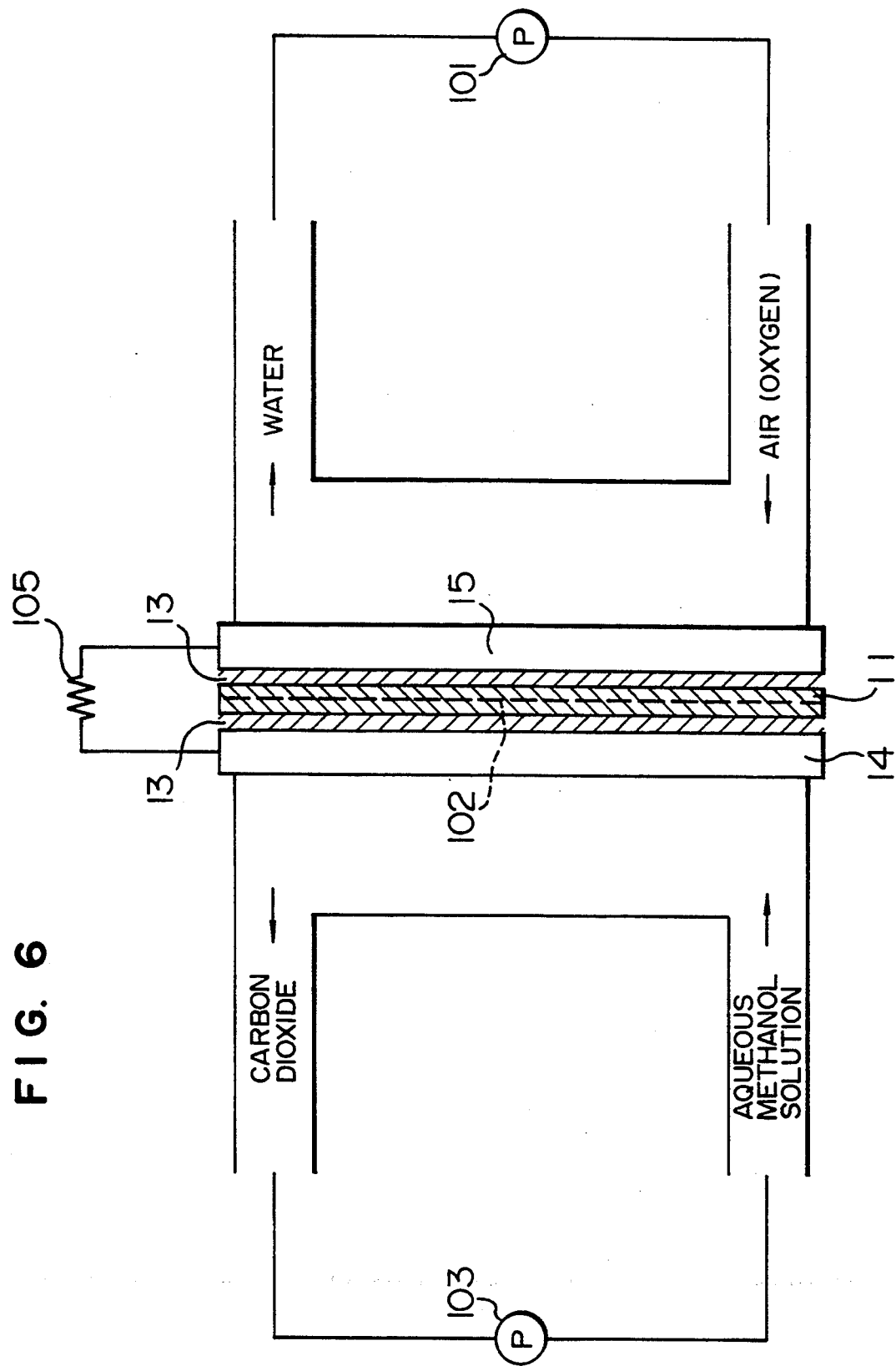
FIG. 6 is a schematic diagram showing an outline of the structure of a fuel cell of an example.
Figure 7:
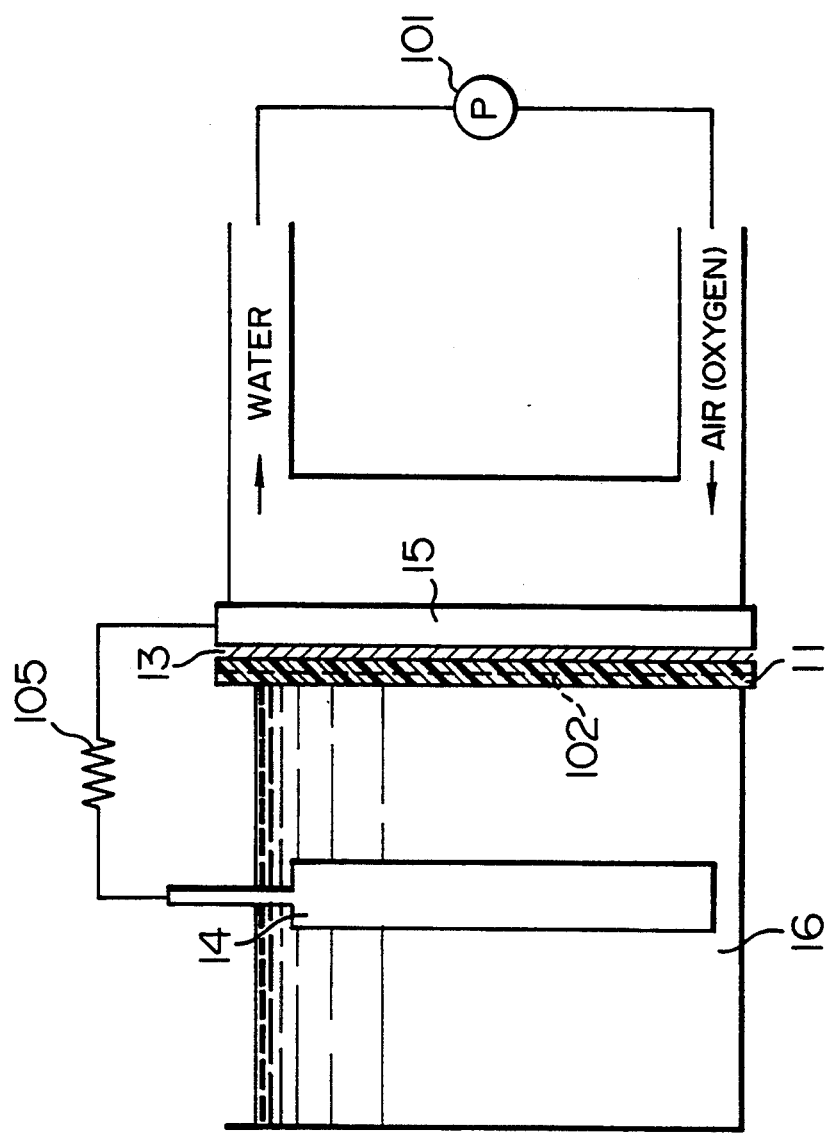
FIG. 7 is a schematic diagram showing an outline of the structure of a fuel cell of another example.
Figure 8:
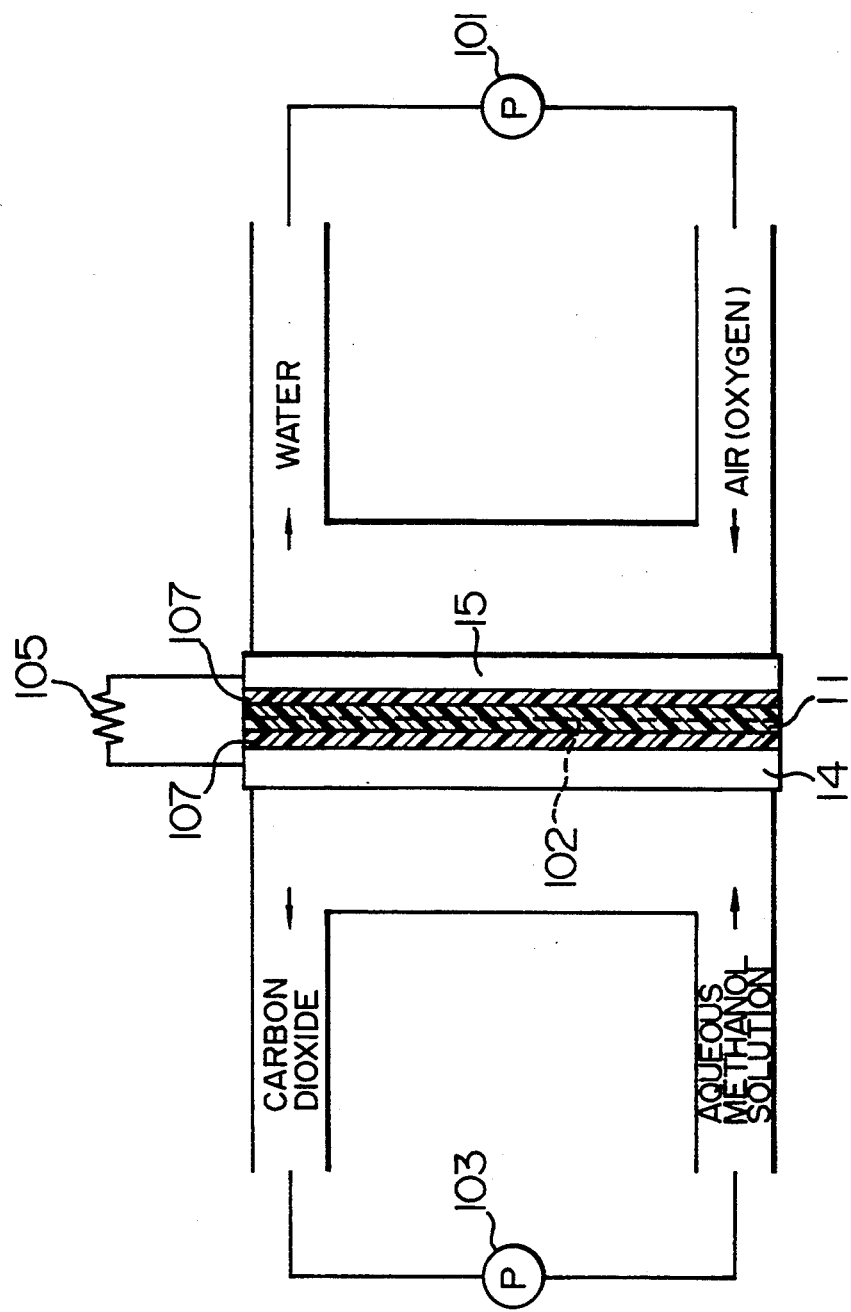
FIG. 8 is a schematic diagram showing an outline of the structure of a fuel cell of still another example.

FIGS. 6 to 8 show examples of fuel cell provided with the electrolyte membrane 11 of the example. In the cell shown in FIG. 6, a fuel electrode 14 and an oxidation agent electrode 15 are placed on both sides of the membrane 11, respectively. The space between the membrane 11 and each electrode is filled with an electrolysis solution 13. In FIG. 6, the symbol 101 shows a pump for circulating an oxidation agent (air), the symbol 102 a porous supporting member, the symbol 103 a pump for circulating fuel (an aqueous methanol solution), and the symbol 105 an external resistance. Other well-known members provided in the fuel cell are omitted in FIG. 6.

Unlike a conventional Nafion 117 (a trade name, E.I. du Pont de Nemours & Co.) membrane, the membrane 11 of the example is not flexible. Therefore, the boundary surface between the membrane 11 and the fuel electrode 14 or the oxidation agent electrode 15 does not have a three-dimensional structure, unlike the boundary surface between the conventional Nafion 117 (a trade name, E.I. du Pont de Nemours & Co.) membrane and the electrode 14 or 15. That is, the membrane 11 is not closely joined to the electrode 14 or 15. Accordingly, in the case of such an electrodes-electrolyte placement, no sufficient ion exchange takes place. Therefore, as described above, the space between the methanol-excluding membrane 11 and each electrode is filled with the electrolysis solution 13.

The fuel cell shown in FIG. 7 has the following structure. An anolyte 16 consisting of a mixed aqueous solution of methanol and sulfuric acid is supplied to one side of the electrolyte membrane 11, and a fuel electrode 14 is placed in the anolyte 16. On the other hand, an oxidation agent electrode 15 is placed on the other side of the membrane 11 with an electrolysis solution 13 placed between the membrane 11 and the electrode 15.

FIG. 8 shows an outline of the structure of a fuel cell provided with a membrane-electrodes joined product formed by placing a Nafion layer 107 between the electrolyte membrane 11 and each of electrodes 14 and 15 and thereby joining the membrane 11 and the electrodes 14 and 15 to each other. The same members as in FIG. 6 are expressed by the same symbols as in FIG. 6 and an explanation of these members is omitted.

When the Nafion layer 107 is thus placed between the membrane 11 and each of the electrodes 14 and 15, a sufficient ion exchange, i.e., a sufficient conduction of hydrated protons, takes place between each electrode and the electrolyte membrane.

Although methanol was used as fuel in the fuel cells described above, the electrolyte membrane of the example can be used in fuel cells of all types in which hydrazine, phosphoric acid, etc. are utilized.

Japanese Patent Applications Appln. No. Hei-3-342554 filed Dec. 25, 1991 and Appln. No. Hei-4-167124 filed Jun. 25, 1992 are incorporated herein by reference.

The present invention has been described in detail, it should be understood that various changes, substitutions and alternations can be made hereto without departing from the spirit and scope of the present invention as defined by the appended claims.

What is claimed is:

1. A fuel cell comprising:
   an oxidation agent electrode;
   a fuel electrode;
   an electrolyte membrane comprising a three-dimensional structure composed of bridged chains of a first polymer stable to water, and a polyelectrolyte, wherein the said three-dimensional structure and said electrolyte is substantially uniformly distributed in the membrane.

2. A fuel cell according to claim 1, further comprising a porous supporting member which supports said three-dimensional structure and said electrolyte.

3. A fuel cell according to claim 1, wherein both the polymer constituting said three-dimensional structure and a polymer constituting the electrolyte are polymers containing no fluorine.

4. A fuel cell according to claim 3, wherein the polymer constituting said three-dimensional structure is a polymeric alcohol, and the polymer constituting said electrolyte is at least one polymer selected from the group consisting of sulfonated products of polystyrenes, polyethylenes, acrylic resins, methacrylic resins, styrene-butadiene copolymers, styrene-divinylbenezene copolymers and ethylene-vinyl alcohol copolymers.

5. A fuel cell according to claim 1, wherein the polymer constituting said three-dimensional structure is a polymeric alcohol, and a polymer constituting said electrolyte is a sulfonated product of a fluorine-containing polymer.

6. A fuel cell according to claim 5, wherein the sulfonated product of a fluorine-containing polymer is a perfluorosulfonic acid polymer.

7. A fuel cell according to claim 4, wherein said polymeric alcohol is a poly(vinyl alcohol), and the polymer constituting said electrolyte is a poly(styrenesulfonic acid).

8. A fuel cell according to claim 7, wherein the weight ratio of said poly(vinyl alcohol) to said poly(styrenesulfonic acid) is 1:1 to 3:1.

9. A fuel cell according to claim 7, wherein the weight ratio of said poly(vinyl alcohol) to said poly(styrenesulfonic acid) is 3:2.

10. A fuel cell according to claim 7, wherein the average molecular weight of said poly(vinyl alcohol) is 1,700 or more, and the average molecular weight of said poly(styrenesulfonic acid) is 100,000 or more.

11. A fuel cell according to claim 1, further comprising a fluorine-containing ion-exchange resin, said resin being placed between said electrolyte membrane and each of said electrodes.

12. A fuel cell according to claim 11, wherein the first polymer used in said electrolyte membrane is a poly(vinyl alcohol), and a polymer constituting said electrolyte is a poly(styrenesulfonic acid).

13. A fuel cell according to claim 1, further comprising fluorine-containing ion-exchange resin layers among the electrodes and the electrolyte membrane, the electrodes and electrolyte membrane being jointed with the resin layers.

14. A fuel cell according to claim 13, wherein the electrodes and electrolyte membrane being hot-pressed with each other placing the resin layers among them.

15. An electrolyte membrane for a fuel cell, comprising;
    a three-dimensional structure composed of bridged chains of a polymeric alcohol stable to water; and a polyelectrolyte which is a sulfonated product of a fluorine-containing polymer having ion-exchange ability; wherein said three dimensional structure and said electrolyte is supported by a porous supporting member and is substantially uniformly distributed in the membrane.

16. An electrolyte membrane for a fuel cell according to claim 15, wherein the sulfonated product of a fluorine-containing polymer is a perfluorosulfonic acid polymer.

* * * * *